Patented Sept. 1, 1936

2,053,208

UNITED STATES PATENT OFFICE 2,053,208

COLOR LAKE

Francis J. Curtis, Belmont, Mass., assignor to Merrimac Chemical Company, Everett, Mass., a corporation of Massachusetts No Drawing. Application December 13, 1934, Serial No. 757,335

8 Claims. (Cl. 134—58.5)

This invention relates to the manufacture of color lakes and it has particular application to the manufacture of color lakes which are formed by the intimate association of a dye with a precipitated base of aluminum hydroxide.

The present application is a continuation in part of applicant's prior application, Serial No. 611,946, filed May 17, 1932, and entitled Color lakes.

The invention has for its objects:

The provision of a process of forming color lakes containing an aluminum base in which the aluminum compound is precipitated into a smooth, fluffy state especially suited for lake formation;

The provision of a process of forming color lakes having an aluminum base in which the amount of washing required to free the base of soluble salts is reduced to a minimum;

The provision of a process of forming aluminum containing bases for color lakes in which settling, clearing and filtration of the base from the solution occurs more readily than conventional processes;

The provision of a process of forming aluminum containing bases for color lakes in which the amount of material to be handled and the apparatus requisite therefor are reduced to a minimum; and, The provision of a color lake containing a base of aluminum hydroxide which is more brilliant and uniform in color than has heretofore been obtainable by the processes known to the art.

A common form of color lake adaptable for incorporation in paints, varnishes, the tinting of paper, etc., comprises a finely divided pigmentary base consisting of aluminum hydroxide having a suitable dye intimately associated therewith. In some cases the intimacy of the association of the base and the dye is increased by the addition of a suitable fixing agent, for example, a soluble salt of barium (barium chloride), lead or tin.

Aluminum hydroxide bases suitable for such lakes have heretofore been prepared by the reaction of solutions of aluminum sulfate and sodium carbonate to form aluminum hydroxide. The reaction involved in the precipitation of the aluminum hydroxide probably may be represented simplified as follows:

$$4Al_2(SO_4)_3 + 12Na_2CO_3 \rightarrow 4Al_2O_3 + 12Na_2SO_4 + 12CO_2$$

In such process it will be manifest that a large amount of soluble alkali salt (sodium sulfate) was formed and it, of course, was necessary to remove this salt by washing the precipitated base with water. It has now been found that the washing process required was so extensive that a material amount of the precipitated dye was washed from the base with which it was associated and as a result the brilliancy of the color lake was distinctly impaired.

Where a fixing agent such as barium chloride was employed in combination with the dye, the excess of sulfate as sodium sulfate, of course, reacted with the barium and was precipitated as barium sulfate in finely divided form. This precipitated barium sulfate within itself was not objectionable and in some cases it was helpful because it tended to carry down the dye into association with the lake base. However, the removal of the sulfate from the system in this manner did not necessarily facilitate the washing operation because the sodium sulfate was transformed into sodium chloride in accordance with the equation:

$$BaCl_2 + Na_2SO_4 \rightarrow BaSO_4 + 2NaCl$$

which in such large quantities was frequently objectionable.

This invention involves the discovery that sodium aluminate may be caused to react under suitable conditions with aluminum sulfate to form a smooth, flocculent precipitate of aluminum hydroxide which is ideally suitable as a lake base and which does not contain nearly so great a proportion of soluble sodium sulfate as the lake bases heretofore obtained by the reaction of sodium sulfate and sodium carbonate. The reaction between the sodium aluminate and the aluminum sulfate may be represented by the following equation:

$$Al_2(SO_4)_3 + 3Na_2Al_2O_4 \rightarrow 4Al_2O_3 + 3Na_2SO_4$$

By comparison of this equation with the first one above given it will be apparent that in proportion to the amount of alumina formed only one-fourth as much soluble sulfate is produced by the use of sodium aluminate as by the use of sodium carbonate.

Although sodium aluminate in combination with aluminum sulfate, in regard to soluble salts, appears to be exceptionally well suited for the formation of lake bases, in actual practice technical difficulties have been encountered in the use of such processes by reason of the fact that the alumina thus produced was found to be hard and glassy and not suitable for use as a lake base.

Applicant has now observed that this inferiority of the lake bases as obtained from sodium aluminate and aluminum sulfate, by simple direct combination of these two compounds, was due to the excessively high alkalinity of the solution in which the base was precipitated. This apparently was due, at least in part, to the fact that sodium aluminate as commercially prepared always contains material amounts of excess alkali. This excess may amount to from five to twenty per cent.

Applicant now finds that where care is observed to maintain this alkalinity below a critical pH value of 8.5 during the reaction of the sodium aluminate with the aluminum sulfate, aluminum hydroxide is precipitated in a smooth, flocculent form which, upon drying, is entirely free from the objectionable hard glassy characteristics attending the use of sodium aluminate and sodium sulfate under the usual conditions where the alkalinity of the solution containing the reaction ingredients is not controlled.

The following constitutes a specific example illustrating the preparation of a lake base in accordance with the provisions of this invention: Approximately 68 grams of a commercial grade of sodium aluminate as a 10% water solution, containing approximately 5% of excess alkali, is brought to the boiling temperature. About 94 grams of aluminum sulfate, also as a 10% water solution, is heated to 170° F. The sodium aluminate is then added to the aluminum sulfate over a period of about 10 minutes. The mixture is stirred for a further period of 10 minutes. During the addition of the sodium aluminate to the aluminum sulfate care is exercised to prevent the alkalinity from rising above the critical value of 8.5. This, of course, may be accomplished by the addition of a suitable amount of acid, such as hydrochloric acid or sulfuric acid. The aluminum sulfate by hydrolyzation also acts as an acid and if a sufficient excess is present it also acts to neutralize the free alkali. The precipitate is washed by decantation until it is sulfate free (which, of course can be ascertained by a suitable test of the wash water with barium chloride). The final washing is accomplished upon a suction filter.

In order to obtain a color lake the cake of aluminum hydroxide as thus produced and while still in the moist state, is replaced in a beaker and enough water added to bring the total water present to the original value present at the conclusion of the addition of the sodium aluminate solution to the aluminum sulfate solution. The suspension of aluminum hydrate is then stirred, in order to obtain uniform admixture, for a period of about 10 minutes. A dye (for example, alphazurine F. G.) as a 2% solution of 50 cc. volume is incorporated into the suspension with stirring. Next 1.38 grams of 32° Bé. aluminum chloride solution diluted to 20 cc. volume with water is added and stirring is continued for 10 minutes. The cake constituting the color lake is filtered off upon a Buchner funnel. No washing of the precipitate is required. The cake may be dried at 135° F.

It will, of course, be appreciated that a fixing agent such as barium chloride or a soluble salt of lead or tin may be employed for purposes of increasing the tenacity of union between the dye and the lake base. The following constitutes a specific example where barium chloride is used for thus purpose: Approximately 5.9 parts of aluminum sulfate are dissolved in water to form a 10% solution to which a molecularly equivalent proportion of 3% commercial sodium aluminate is added. Of course, necessary precautions should be taken to prevent the pH value from rising above the critical 8.5, as determined, for example, by use of brilliant yellow paper, which changes color within the pH range of 6-8. To the floc obtained a suitable dye, such as "orange II" is added, together with 15 parts of barium chloride and 10 ports of blanc fixe. The soluble salts (sodium chloride) are removed by washing approximately four times with water.

If barium chloride, as given in the above example, is employed as the dye fixing agent, a much smaller percentage of it is converted to barium sulfate than in the conventional process. However, barium sulfate, which costs only approximately half as much as barium chloride, may be added directly to the lake to compensate for any desirable results which are lost by reason of the reduction. Further material economies of operation are thus obtained.

Any dye suitable for use in alumina base lakes may be used in the above processes in lieu of orange II or alphazurine. These are only given by way of example.

Examples of additional dyes are methylene blue, Victoria green, alizarine blue and orange R. O. Best results are obtained by regulating the pH value to obtain maximum dye absorption which, for the above compounds, will be approximately as follows:

Methylene blue _____ 4.21 to 7   preferably 5.41
Victoria green_____ 4.86 to 7   preferably 6.86
Alizarine blue_____ 4.00 to 8.4 preferably 5.84
Orange R. O._____ 4.19 to 6.27 preferably 4.96

These pH values are obtained either by regulating the proportions of sodium aluminate and aluminum sulfate or by adding acid. It will be appreciated that the precipitation of alumina is more complete at the higher pH values. However, it should never be permitted to rise above 8.5. It should also be kept from falling so low that alumina cannot precipitate in adequate quantities. Approximately four seems to be about the minimum range.

As previously indicated, color lakes as prepared by this process are characterized by greater brilliancy than those prepared in the usual manner from aluminum sulfate and sodium carbonate and because the reduction in the degree of washing required by applicant's process reduces the leaching action upon the dye. This reduction in the washing required, of course, effects material economies in labor and equipment in operation. Further economies of the same character are effected by reason of the fact that from a given quantity of sodium sulfate four times as much alumina base is obtained. This, of course, reduces labor and conserves equipment.

Additional economies are effected by reason of the fact that sodium aluminate and aluminum sulfate produce a floc which settles more rapidly to give a clearer solution which is more readily filtered than the products obtained by the conventional reaction of sodium carbonate and aluminum sulfate.

It will be appreciated that the foregoing procedure illustrates only certain embodiments of the invention and that numerous modifications of these embodiments may be employed without departure from the spirit of the invention or the scope of the appended claims.

What I claim is:

1. A method of preparing a color lake which consists in reacting aluminum sulphate with sodium aluminate in solution at a pH value not greater than 8.5 and above approximately 4 to form a lake base, and subsequently incorporating a dye thereinto.

2. A method of preparing a color lake which comprises reacting sodium aluminate containing a material amount of alkali with aluminum sulfate in solution while maintaining the pH value at not greater than 8.5 and above approximately 4 to form a precipitate of aluminum hydroxide, and subsequently incorporating a dye thereinto.

3. A method of preparing a color lake which comprises reacting sodium aluminate containing a material amount of free alkali with aluminum sulfate in solution at a pH value below approximately 8.5 and above approximately 4 to form a lake base, and incorporating thereinto a dye and a salt capable of forming a complex with said dye.

4. A process of preparing a color lake which comprises reacting sodium aluminate containing 5% to 20% of free alkali with aluminum sulfate in solution in molecularly equivalent proportions to form aluminum hydroxide while maintaining the pH value at not greater than 8.5 and above approximately 4, adding a dye thereto and subjecting the whole to washing to remove soluble sulfates.

5. A process as defined in claim 1 in which preformed barium sulfate is added to the base.

6. A process as defined in claim 4 in which preformed barium sulfate is added to the lake base.

7. A method of preparing a color lake which consists in reacting aluminum sulphate with sodium aluminate in solution at a pH value not greater than 8.5 nor less than approximately 4 whereby aluminum hydroxide is formed, adding barium chloride and a dye that is precipitated by the aluminum hydroxide and barium chloride to the aluminum hydroxide and barium chloride and subsequently washing the water soluble salts from the resulting mixture.

8. In the manufacture of color lakes wherein aluminum hydroxide and barium sulphate are formed, the steps which include forming the aluminum hydroxide by reacting aluminum sulphate with sodium aluminate in solution at a pH value not greater than 8.5 nor less than approximately 4 and subsequently adding barium chloride and a dye that is precipitated by the barium chloride to the aluminum sulphate-sodium aluminate reaction mixture.

FRANCIS J. CURTIS.